April 17, 1928.

J. J. CAMPODONICO 1,666,526

TRACTION WHEEL

Filed June 26, 1926

INVENTOR.
John J. Campodonico.
BY
Townsend, Loftus & Ablett
ATTORNEYS.

April 17, 1928.

J. J. CAMPODONICO 1,666,526

TRACTION WHEEL

Filed June 26, 1926

INVENTOR.
John J. Campodonico.
BY
ATTORNEYS.

Patented Apr. 17, 1928.

1,666,526

UNITED STATES PATENT OFFICE.

JOHN J. CAMPODONICO, OF STOCKTON, CALIFORNIA.

TRACTION WHEEL.

Application filed June 26, 1926. Serial No. 118,810.

This invention relates to traction wheels and particularly to improvements on the structure shown in my co-pending application entitled "Traction wheel" filed July 5, 1924, Serial Number 724,272.

The wheel shown in my co-pending application is provided with a series of staggered shoes or tread members so attached that a flat, flexible track will be presented as the wheel rotates. The wheel is further provided with a stationary fixed cam and an intermediate linkage system whereby the shoes are automatically positioned as they approach the ground surface. This linkage system is complicated, as it is of necessity resilient or yielding in action. It requires numerous parts and has been the source of considerable trouble in actual operation.

The object of the present invention is to generally improve and simplify the construction of the cam mechanism whereby the shoes are actuated, and further to so arrange the cam and shoes that the shoes may be directly actuated by the cam, thereby entirely eliminating the intermediate linkage structure formerly employed.

The invention is shown by way of illustration in the accompanying drawings in which—

Figure 1:
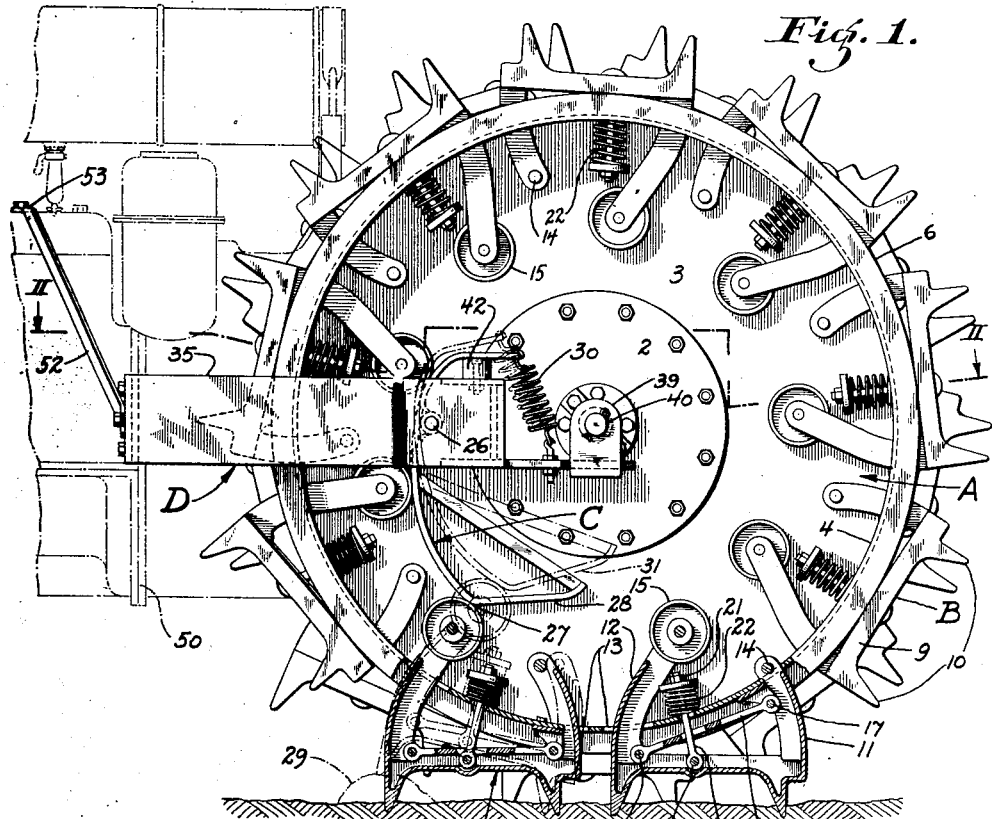
Figure 1 is a side elevation of the traction wheel, said view being partially in section.
Figure 2:
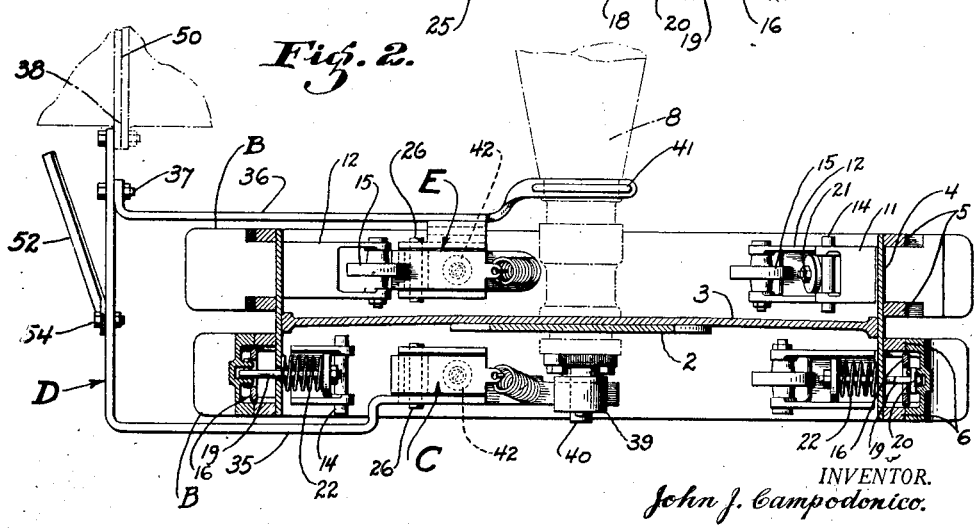
Figure 2 is a plan section taken on line II—II of Figure 1.

Referring to the drawings in detail, and particularly to Figures 1 and 2, "A" indicates in general a traction wheel of the disk wheel type. It consists of a hub section, 2, to which is secured a disk 3. Welded or otherwise secured to the outer periphery of the disk is a rim section 4 and welded or otherwise secured on the exterior face of the rim are two pairs of annular rail members, 5 and 6. These rails are ring-shaped and they form supports for a plurality of shoes generally indicated at "B". The hub section of the wheel is keyed, splined, or otherwise secured to a driving shaft, a portion of which is shown at 7 in Figure 3. This shaft extends through a housing 8 shown partly in full lines in Figure 3 and in dotted lines in Figure 2, the wheel being in other words supported and driven in the usual manner.

The shoes indicated at "B" may be of any suitable construction. They are, in this instance, shown as consisting of plate-like sections 9 on the outer surface of which is formed grousers, 10. The inner surface of the plates is engaged by the annular rail members 5 and 6, and the shoes as such form a flat and flexible track over which the wheel is adapted to travel. The shoes are all provided with a pair of arcuated arms, 11 and 12, formed on opposite ends which project through slots or openings 13 in the rim. The inner ends of the arms 11 are provided with pins 14, which limit outward movement of the shoes and the opposite arms 12 are provided with rollers 15 the function of which will hereafter be described. All the shoes are pivotally attached to the rim by means of links 16, one end of each link being pivotally attached to the rim as at 17, while the opposite end is pivotally attached to the shoe as at 18. These links form a driving connection between the shoes and the wheel and they also form a connection whereby both or either ends of the shoes may move outwardly with relation to the rim. The shoes are otherwise resiliently attached to the rim through means of bolts 19. These bolts are pivotally attached to the shoes as at 20, and they extend through openings in the rim. The inner ends are provided with nuts and washers as indicated at 21, and springs 22 are interposed between the washers and the rim, the tension of the springs being such that the shoes are normally held in engagement with the rails of the rim, as shown in Figure 1. It should further be noted that the bolts 19 are placed off center with relation to the shoes, and as such has a tendency to hold one end of each shoe in fairly close contact with the rails and the rims. This is important as it places the shoes in substantially the correct position when reversing the traction wheel, as will hereafter be described.

When operating a traction wheel of this character, it has been found desirable to swing the shoes about their pivotal connections so that they assume a substantially horizontal position as they approach the ground. See, for instance, the position of the shoe 25 in Figure 1. Such a position is important, as it forms a flat track for the wheel to travel on and it furthermore increases the traction or grip formed between the wheel and the ground. The present application illustrates a mechanism whereby the shoes are automatically swung about their pivotal connections to assume a substantially horizontal position when approaching the ground. This mechanism consists of a cam generally indicated at "C". This cam is pivotally mounted as at 26 on a stationary frame generally indicated at "D". The lower end of the cam engages the rollers 15 and such engagement between the rollers and the cam causes the forward ends of the shoes to swing outwardly about the pivots 17 so that they assume a substantially horizontal position as they approach the ground. The complete projected position of the shoes is assumed when the point 27 of the cam is reached. From this point the cam is slightly inclined in an upward direction, as indicated at 28. This portion of the cam maintains the shoe in a horizontal position as the wheel travels over the shoes and the rollers travel out of engagement with the cam section 28 when the wheel has passed substantially over the shoe.

In traveling over uneven or rocky ground, the forward points of the shoes often engage rocks such as indicated by dotted lines at 29. The entire load of the tractor would, under such conditions, be thrown on that particular shoe and the cam "C" and breakage would likely take place unless a resilient or yielding structure is employed. Such resiliency is obtained in the present instance by pivoting the cam at the point indicated at 26 and connecting the upper end thereof with a spring 30. When a rock such as indicated at 29 is encountered, cam "C" swings about its pivot 26 and assumes the dotted line position indicated at 31. The entire mechanism is accordingly relieved of any excess stresses or strains. The tension of the spring 30 is, however, sufficient under ordinary conditions to insure complete projection of the shoes.

By referring to Figure 2, it will be noted that the rim is provided with two sets of shoes. These shoes are staggered with relation to each other and as such are preferably actuated by independent cams. The outer set of shoes are actuated by the cam "C" while the inner set of shoes are actuated by the cam "E". These cams are identical in construction and operation and the description of one should therefore suffice.

Figure 3:
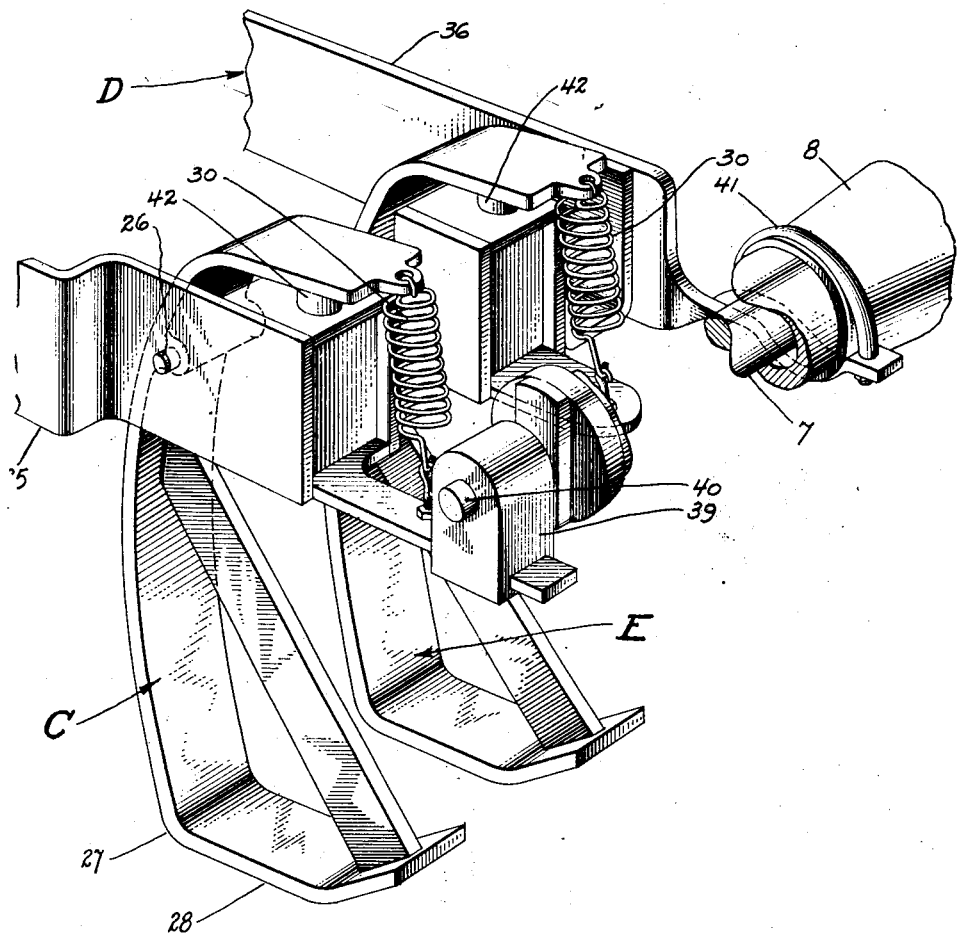
Figure 3 is a perspective view of the cam structure and a portion of the frame supporting the same.

The frame "D" supporting the cams is perhaps best illustrated in Figures 2 and 3. It consists of a pair of arms 35 and 36 which are joined together at the point 37 and then extended and secured to the tractor engine frame as shown at 38. The inner end of the arm 35 is provided with a journal member 39 which is supported on the outer end of the driving shaft 7, or an extension thereof such as indicated at 40. The arm 36 of the frame is secured to the axle housing 8 by means of a U-bolt 41 and a rigid, substantial support is thus formed for the two cam members. The inner ends of the arms 35 and 36 to which the cams are pivotally attached as at 26 are preferably constructed as shown in Figure 3, as rubber bumpers 42 or the like must be employed to limit the outward movement of the cams "C" and "E"; that is, the tension or pull of the springs 30 is such that they would swing the cams "C" and "E" about the pivots 26 into contact with the inner surface of the rim. Such projection or swinging of the cams would be excessive and it is accordingly necessary to limit their movement by interposing the bumpers 42.

The traction wheel illustrated in this application has been successfully employed on "Fordson" and like tractors. A portion of a Fordson tractor is indicated in dotted lines in Figures 1 and 2. The engine housing and transmission housing of a Fordson tractor are bolted together at the point indicated at 50. This is taken advantage of in the present instance, as the arms 35 and 36 are attached to this point of the tractor by the bolts as indicated at 51. It will also be noted that a brace arm 52 may be employed as this may be extended from one of the engine head bolts as indicated at 53 to the middle of the frame as indicated at 54, thereby further increasing the rigidity of the frame whereby the cams are supported.

The wheel shown in this application is exceedingly simple when comparison is made with the structure shown in my former application already referred to, as a simpler form of cam mechanism is employed and the linkage structure is entirely eliminated; that is, the cams shown in this instance directly engage the shoes and thereby automatically actuate or project the shoes as they approach the ground surface. If rocks or other obstructions are encountered, sufficient resiliency is provided to eliminate the transmission of damaging stresses and strains and while certain features of the present application may be more or less specifically described and illustrated, I wish it understood that changes may be resorted to within the scope of the appended claims.

Having thus described my invention, what I claim and desire to secure by Letters Patent is—

1. A device of the character described, comprising a traction wheel, a plurality of shoes attached to the exterior face of the wheel and forming a flexible track therefor, and a resiliently supported cam member engageable with the shoes and adapted to swing the shoes so that they will assume a substantially horizontal position as they approach the ground surface over which the wheel travels.

2. A device of the character described, comprising a traction wheel, a plurality of shoes attached to the exterior face of the wheel and forming a flexible track therefor, a member on each shoe extending inwardly through the face of the wheel, and a cam adapted to engage said members and thereby position the shoes so that they will assume a substantially horizontal position as they approach the ground surface over which the wheel travels.

3. A device of the character described, comprising a traction wheel having a rim portion, a plurality of shoes pivotally attached to the exterior face of the rim and forming a flexible track therefor, an arm on each shoe extending inwardly through the rim, a roller on each arm, and means directly engaging the rollers during a portion of the rotation of the wheel and adapted to swing the shoes about their pivots so that they will assume a substantially horizontal position as they approach the ground surface over which the wheel travels.

4. A device of the character described, comprising a traction wheel having a rim portion, a plurality of shoes pivotally attached to the exterior face of the rim and forming a flexible track therefor, an arm on each shoe extending inwardly through the rim, a roller on each arm, and a resiliently supported cam member directly engaging the rollers during a portion of the rotation of the wheel and attached to swing the shoes about their pivots so that they will assume a substantially horizontal position as they approach the ground surface over which the wheel travels.

5. A device of the character described, comprising a traction wheel having a rim portion, a plurality of shoes pivotally attached to the exterior face of the rim and forming a flexible track therefor, an arm on each shoe extending inwardly through the rim, a roller on each arm, a pivotally mounted cam member directly engaging the rollers during a portion of the revolution of the wheel and adapted to swing the shoes about their pivots so that they will assume a substantially horizontal position as they approach the ground surface over which the wheel travels, and a spring connected with the cam to resiliently support the cam while in engagement with the shoes.

6. A device of the character described, comprising a traction wheel having a rim portion, a plurality of shoes pivotally attached to the exterior face of the rim and forming a flexible track therefor, an arm on each shoe extending inwardly through the rim, a roller on each arm, a pivotally mounted cam member directly engaging the rollers during a portion of the revolution of the wheel and adapted to swing the shoes about their pivots so that they will assume a substantially horizontal position as they approach the ground surface over which the wheel travels, and a spring connected with the cam to resiliently support the cam while in engagement with the shoes.

JOHN J. CAMPODONICO.